(12) United States Patent
Denny-Brown et al.

(10) Patent No.: US 11,516,216 B2
(45) Date of Patent: *Nov. 29, 2022

(54) AUDITING FOR REMOTELY STORED CREDENTIALS

(71) Applicant: Snowflake Inc., Bozeman, MT (US)

(72) Inventors: Derek Denny-Brown, Seattle, WA (US); Tyler Jones, San Francisco, CA (US); Isaac Kunen, Seattle, WA (US)

(73) Assignee: Snowflake Inc., Bozeman, MT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/241,476

(22) Filed: Apr. 27, 2021

(65) Prior Publication Data

US 2021/0344677 A1 Nov. 4, 2021

Related U.S. Application Data

(63) Continuation of application No. 16/861,739, filed on Apr. 29, 2020, now Pat. No. 11,057,381.

(51) Int. Cl.
*H04L 9/40* (2022.01)
*G06F 21/31* (2013.01)

(52) U.S. Cl.
CPC .......... *H04L 63/0884* (2013.01); *G06F 21/31* (2013.01); *H04L 63/083* (2013.01); *H04L 63/10* (2013.01)

(58) Field of Classification Search
CPC ... H04L 63/0884; H04L 63/083; H04L 63/10; G06F 21/31
See application file for complete search history.

(56) References Cited

U.S. PATENT DOCUMENTS

| 6,732,277 | B1* | 5/2004 | Vandergeest | ........ H04L 63/0442 |
| | | | | 380/277 |
| 6,934,706 | B1* | 8/2005 | Mancuso | ................. G06F 21/41 |
| 7,073,195 | B2* | 7/2006 | Brickell | ................. G06F 21/33 |
| | | | | 705/76 |
| 9,172,699 | B1* | 10/2015 | Vazquez | ................. G06F 21/32 |
| 9,300,644 | B1* | 3/2016 | Dubey | ............... H04L 63/0815 |
| 9,906,956 | B1* | 2/2018 | Huang | ............. H04W 12/0431 |

(Continued)

OTHER PUBLICATIONS

U.S. Appl. No. 16/861,739, filed Apr. 29, 2020, Using Remotely Stored Credentials to Access External Resources.

(Continued)

*Primary Examiner* — Jason Chiang
(74) *Attorney, Agent, or Firm* — Schwegman Lundberg & Woessner, P.A.

(57) ABSTRACT

A credentials store definition identifying a remote credential store is received. The credential store definition includes access information to enable access to the remote credentials store. A credentials object is created in an internal database based on a credentials object definition. The credentials object identifies a security credential to retrieve from the remote credentials store to access an external resource. At runtime, a request to access the external resource is received, and based on receiving the request, the security credentials identified by the credentials object are retrieved from the remote credential store using the access information. The retrieved security credential is provided to a processing component to access the external resource.

24 Claims, 7 Drawing Sheets

(56) References Cited

U.S. PATENT DOCUMENTS

| | | | | |
|---|---|---|---|---|
| 10,298,577 | B1* | 5/2019 | Aithal | H04L 63/126 |
| 11,303,675 | B1* | 4/2022 | Sellers | H04L 63/1416 |
| 2002/0116646 | A1* | 8/2002 | Mont | H04L 63/104 |
| | | | | 726/6 |
| 2002/0116647 | A1* | 8/2002 | Mont | H04L 63/20 |
| | | | | 726/6 |
| 2003/0065626 | A1* | 4/2003 | Allen | G06Q 10/10 |
| | | | | 705/76 |
| 2003/0226036 | A1* | 12/2003 | Bivens | H04L 63/0815 |
| | | | | 726/8 |
| 2006/0095958 | A1* | 5/2006 | Lehinger | G06F 21/6245 |
| | | | | 726/6 |
| 2006/0195907 | A1* | 8/2006 | Delfs | G06F 21/74 |
| | | | | 726/26 |
| 2009/0217367 | A1* | 8/2009 | Norman | H04L 63/0815 |
| | | | | 726/8 |
| 2012/0284786 | A1* | 11/2012 | Somani | H04L 63/0815 |
| | | | | 726/7 |
| 2013/0291076 | A1* | 10/2013 | Duryee | G06F 21/10 |
| | | | | 726/6 |
| 2014/0030688 | A1* | 1/2014 | Lolli | G09B 7/00 |
| | | | | 434/350 |
| 2015/0006906 | A1* | 1/2015 | Chinivar | G06F 21/606 |
| | | | | 713/189 |
| 2015/0096001 | A1* | 4/2015 | Morikuni | H04L 63/08 |
| | | | | 726/7 |
| 2015/0324791 | A1* | 11/2015 | Khan | H04W 12/04 |
| | | | | 705/71 |
| 2016/0014110 | A1* | 1/2016 | Kurspahic | H04L 9/085 |
| | | | | 713/183 |
| 2017/0011213 | A1* | 1/2017 | Cavanagh | G06F 21/31 |
| 2017/0279614 | A1* | 9/2017 | Mercury | H04L 9/3247 |
| 2017/0308695 | A1* | 10/2017 | Adams | H04L 63/0823 |
| 2017/0310663 | A1* | 10/2017 | Krishan | H04L 63/083 |
| 2018/0006883 | A1* | 1/2018 | Melliere | H04L 41/0806 |
| 2020/0028679 | A1* | 1/2020 | Chumbley | G06F 21/31 |

OTHER PUBLICATIONS

"U.S. Appl. No. 16/861,739, Examiner Interview Summary dated Mar. 8, 2021", 2 pgs.

"U.S. Appl. No. 16/861,739, Examiner Interview Summary dated Sep. 8, 2020", 3 pgs.

"U.S. Appl. No. 16/861,739, Final Office Action dated Dec. 3, 2020", 22 pgs.

"U.S. Appl. No. 16/861,739, Non-Final Office Action dated Jun. 5, 2020", 16 pgs.

"U.S. Appl. No. 16/861,739, Notice of Allowance dated Apr. 26, 2021", 18 pgs.

"U.S. Appl. No. 16/861,739, Response filed Mar. 2, 2021 to Final Office Action dated Dec. 3, 2020", 13 pgs.

"U.S. Appl. No. 16/861,739, Response Filed Sep. 2, 2020 to Non-Final Office Action dated Jun. 5, 2020", 12 pgs.

* cited by examiner

AUDITING FOR REMOTELY STORED CREDENTIALS

CROSS-REFERENCE TO RELATED APPLICATION

This application is a Continuation of U.S. patent application Ser. No. 16/861,739 filed Apr. 29, 2020, the contents of which are incorporated herein by reference in their entirety.

TECHNICAL FIELD

Embodiments of the disclosure relate generally to a network-based database system and, more specifically, to facilitating access and use of security credentials maintained by a remote credential store to access external resources.

BACKGROUND

Cloud-based data warehouses and other database systems sometimes rely on external resources such as external data sources, third-party services, and external functionality. These external resources often require use of security credentials (e.g., a username and password) to prevent unauthorized access. Conventional data systems typically include an internal credential store to store security credentials for use when an external resource requiring such credentials is invoked.

However, storing security credentials internally can be problematic for database systems. For example, when a credential associated with an external resource changes (e.g., rotates) in a remote credential store or other remote system (e.g., based on rotation policy or credential compromise), the credential needs to be updated in the internal store of the database system. This often leads to inconsistencies between the remote credential store and the database system credential store, which can disrupt workflows involving the external resource.

As another example, if credentials are stored internally, the database system itself becomes an attack vector. The database system's internal credential management system may not be as secure as a credential store designed to be highly secure, which means that the likelihood of a compromise is higher.

In addition, auditing mechanisms provided by typical database systems are inadequate and do not allow users to sufficiently audit who accessed and used a given credential. In some instances, users must obtain and aggregate information from multiple disparate sources to fully audit security credential use. What's more, some database systems do not have full auditing capabilities to track specific information regarding the use of a given credential and without specific details regarding how credentials are used within a system, it may not be possible to fully understand who has accessed a credential and how the credential was used.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
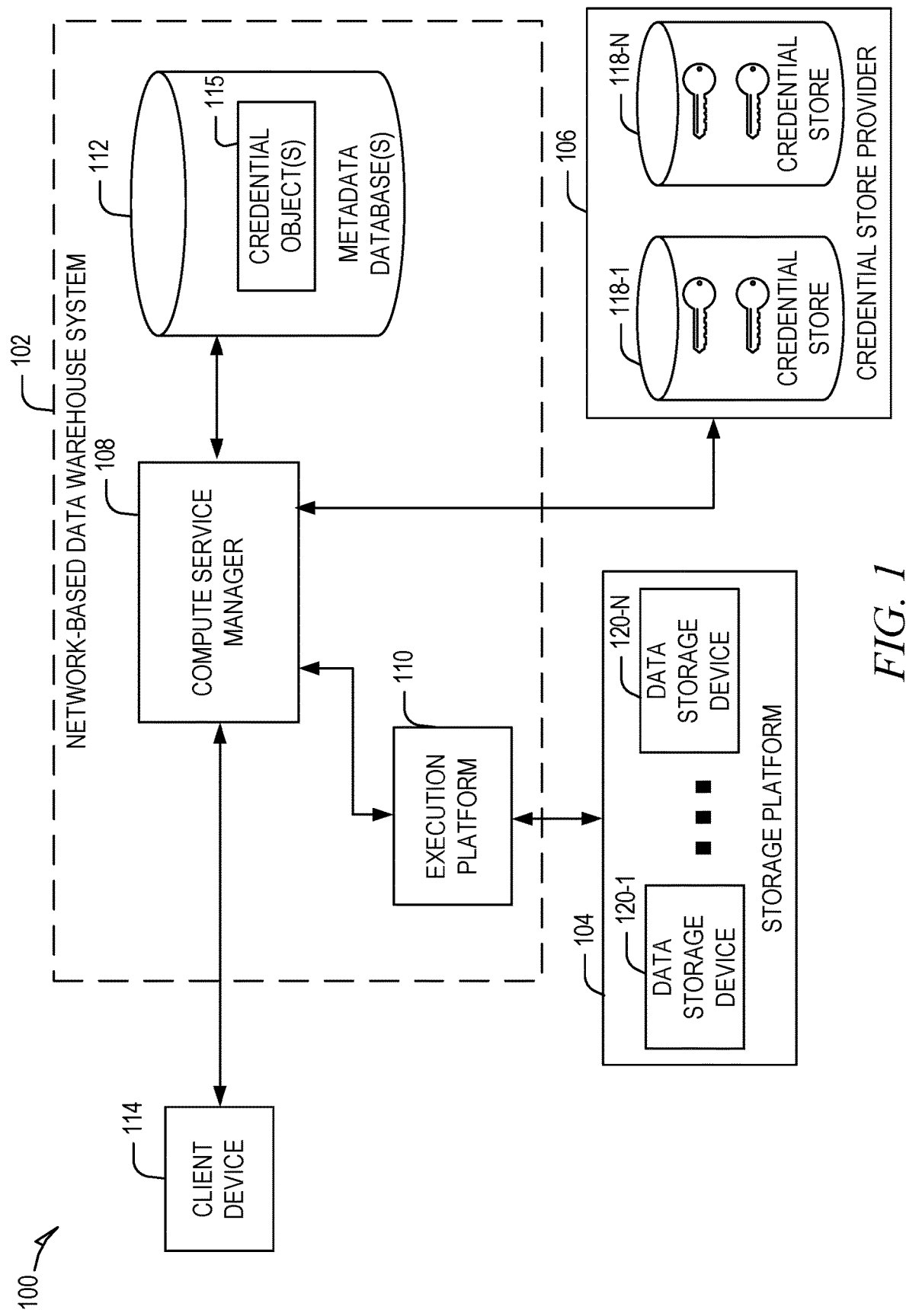
FIG. 1 illustrates an example computing environment that includes a network-based data warehouse system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure address the above and other deficiencies of internal storage of security credentials by utilizing remotely stored credentials to access external resources without storing credentials internally. Rather than storing the credentials themselves, a credential management system in a database system stores and maintains credential objects, which are data structures that include non-sensitive information to identify security credentials that are to be retrieved from a remote credential store maintained by a credential store provider (e.g., Amazon Web Services® (AWS) Secrets Manager®, AWS Parameter Store®, Azure Keyvault®, Google Cloud Platform (GCP) Secrets Manager®, or a Hashicorp Vault®. For a given remote credential store, the credential management system also stores access information that allows the credential management system to securely communicate with the remote credential store and retrieve stored security credentials. An administrative user can grant other users, roles, and functions access to a credential object, and the other users, roles, and functions can use the underlying security credentials in accordance with privileges associated with the credential object.

When a request to access an external resource is received at run-time, the credential management system accesses a credential object associated with the external resource and retrieves security credentials associated with the external resource from a remote credential store using access information associated with the credential store. The credential management system provides the retrieved security credentials to one or more downstream processing components for use in accessing the external resource. The credential management system also creates a record of access of the security credentials based on the account, user, and/or role associated with the request to access the external resource.

The credential management system also allows users to view these records for auditing purposes.

Storing credential objects that reference credentials in remote credential store systems rather than the security credentials themselves provides several benefits. For example, the credential management system allows users of the database system to rotate credentials in their credential store and have them be immediately available for use by the database system without having to update credentials or other information stored by the database system. As an additional benefit, a user can revoke access to the credentials or the credentials store at any point. If credentials are persisted in the database system, then this is not possible short of a user going in and removing them, which presents additional challenges if a system or administrative user is required. Moreover, as discussed above and described further below, credential objects are separated from credential stores, and the credential objects can be selectively granted to users, roles, functions, and other entities within the context of the database system. Current systems that utilize credential-like objects often have restrictions on use. For instance, these systems may tie a given credential to a single entity. By using credential objects, a user can have access to credentials and use them transparently without necessarily having direct access to the credential or credentials store. As yet another benefit, the use of credential objects enables rich auditing mechanisms that allow users to fully audit what sensitive information was accessed at the database system and when.

FIG. 1 illustrates an example computing environment 100 that includes a database system in the example form of a network-based data warehouse system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the computing environment 100 comprises the network-based data warehouse system 102 in communication with a cloud storage platform 104 (e.g., AWS®, Microsoft Azure Blob Storage®, or Google Cloud Storage), and a cloud credential store provider 106. The network-based data warehouse system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based data warehouse system 102.

The network-based data warehouse system 102 comprises a compute service manager 108, an execution platform 110, and one or more metadata databases 112. The network-based data warehouse system 102 hosts and provides data reporting and analysis services to multiple client accounts.

The compute service manager 108 coordinates and manages operations of the network-based data warehouse system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based data warehouse system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based data warehouse system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one of more security credentials to be retrieved by the compute service manager 108 from one of the remote credential stores 118-1 to 118-N (e.g., for use in accessing data stored by the storage platform 104).

The compute service manager 108 is further coupled to the execution platform 110, which provides multiple computing resources that execute various data storage and data retrieval tasks. The execution platform 110 is coupled to storage platform 104 of the cloud storage platform 104. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based data warehouse system 102. Thus, in the described embodiments, the network-based data warehouse system 102 is dynamic and supports regular changes to meet the current data processing needs.

During typical operation, the network-based data warehouse system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
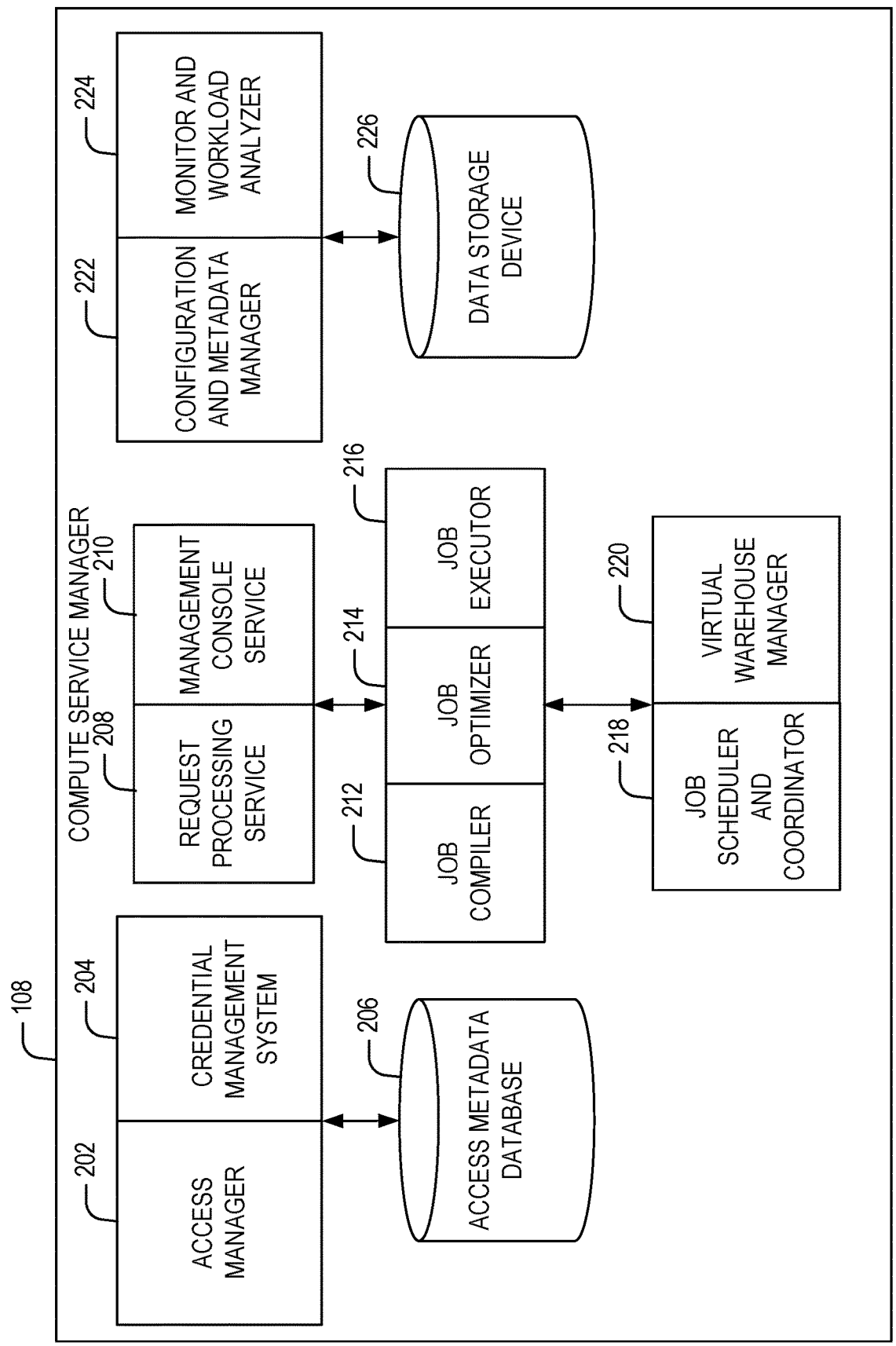
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based data warehouse system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based data warehouse system 102. For example, data storage device 226 may represent buffers in execution platform 110, storage devices in storage platform 104, or any other storage device.

Figure 3:
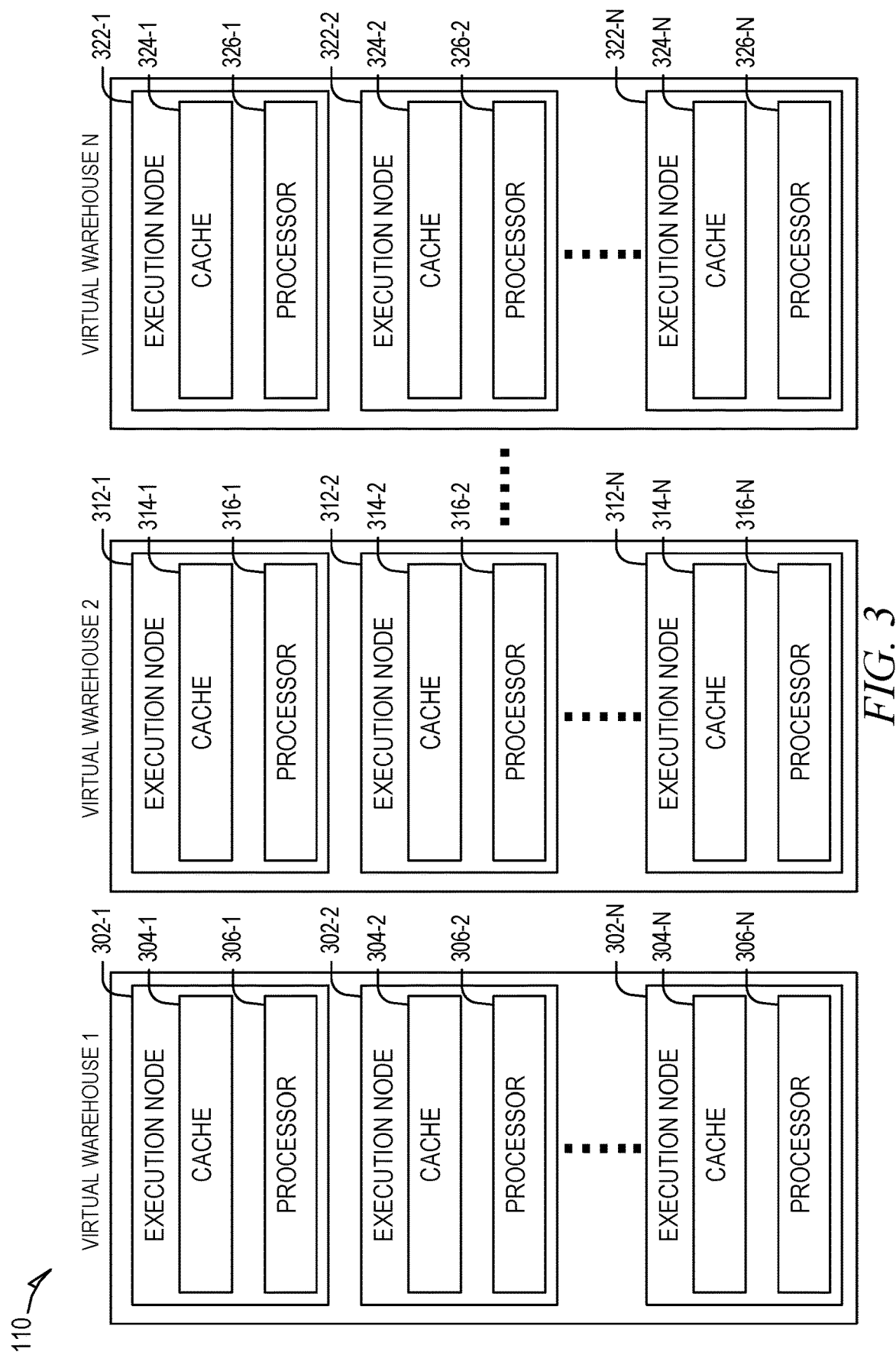
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
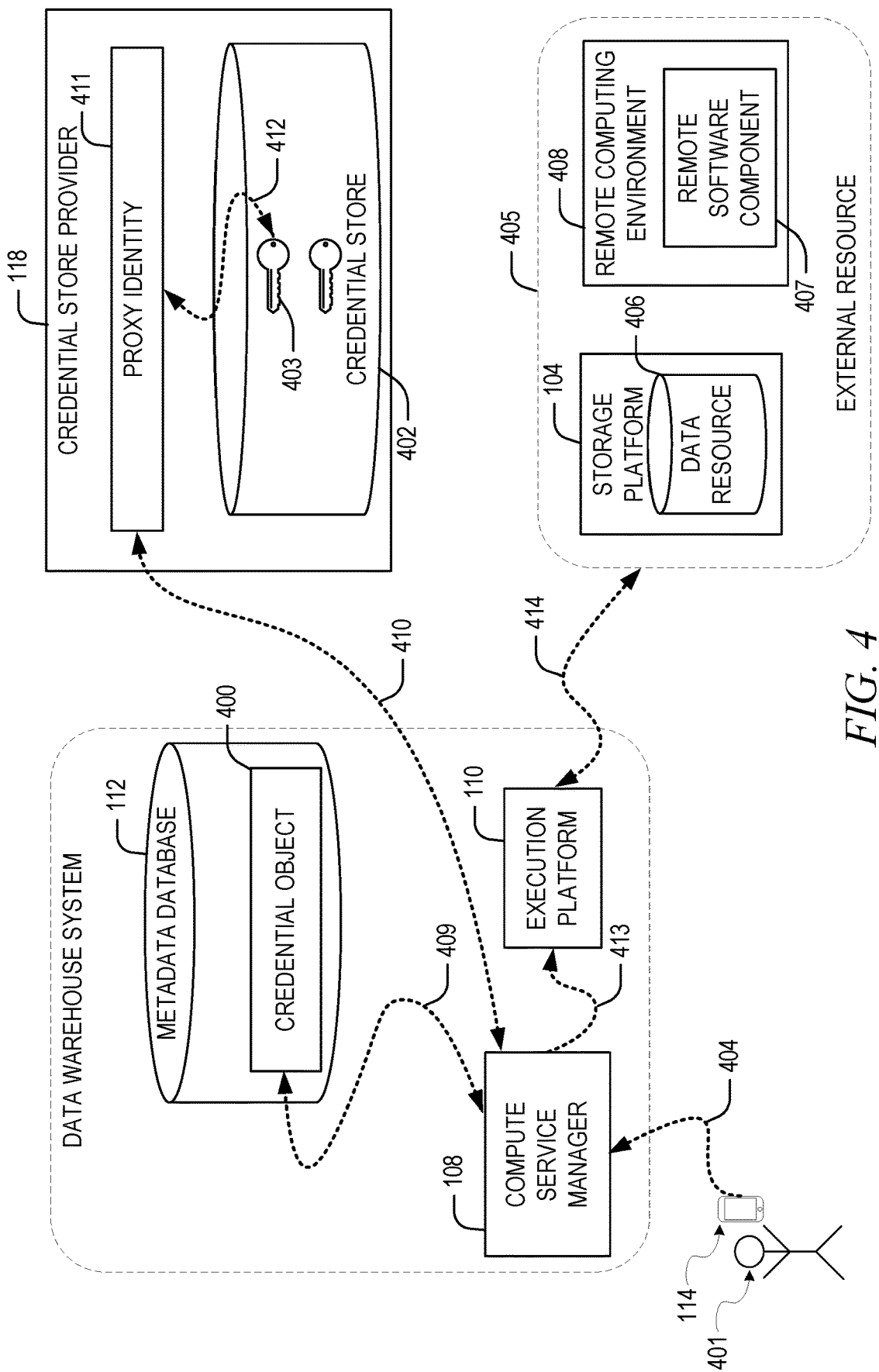
FIG. 4 is a data flow diagram illustrating use of remotely stored credentials to access external resources, in accordance with some embodiments of the present disclosure.

FIG. 4 is a data flow diagram illustrating use of remotely stored credentials to access external resources, in accordance with some embodiments of the present disclosure. As shown, a credential object 400 is stored by a metadata database 112. The credential object 400 is an example of the credential object(s) 115 illustrated in FIG. 1. The credential object 400 is generated by the compute service manager 108 based on input received from a computing device in communication with the network-based data warehouse system 102. For example, a user 401 can utilize a command line or other user interface provided to client device 114 by the network-based data warehouse system 102 to provide a command to create the credential object 400. The command may include a credential object definition.

The credential object 400 identifies a security credential to retrieve from a remote credential store 402 of the credential store provider 118. The remote credential store 402 is an example of one of the credential stores 118-1 to 118-N. In this particular example, the credential object 400 indicates that security credential 403 is to be retrieved from the credential store 402. The credential object 400 may be stored with an association with a credential store definition, which is a data structure that identifies the remote credential store 402. The security credential 403 is used to access an external resource 405 such as a data resource 406 stored by the storage platform 104 or a remote software component 407 executed by a remote computing environment 408. Accordingly, the credential object 400 may also be stored with an association with an identifier or other information used to track the external resource 405.

At 404, the client device 114 sends a request to the compute service manager 108 that includes a request to access the external resource 405. The request may be associated with the user 401, a role assumed by the user 401, or a function invoked by the user 401. It shall be appreciated that the user who provides the command to create the credential object 400 may be a different user from the user that provides the request to access the external resource 405. For example, a first user with administrator privileges—an administrative user—may provide the command to create the credential object 400 and as part of the command, may grant permission to a second user to use the credential object 400 to access the external resource 405. In this example, the second user may provide the command to access the external resource 405 though the second user is unaware of the credential information, which is potentially sensitive information that the second user may not be authorized to view. In this way, administrative users can enable other users to utilize external resources without exposing sensitive security credential information to the other users.

Based on receiving the request to access the external resource 405, the compute service manager 108 accesses the credential object 400 that identifies the security credential 403 associated with the external resource 405 (at 409). Based on the credential object 400 identifying the security credential 403, the compute service manager 108 retrieves the security credential 403 from the credential store provider 118, at 410. In some embodiments, the compute service manager 108 may use credential store access information stored by the metadata database 112 to access and retrieve the security credential 403. For example, the compute service manager 108 may use the access information to assume a proxy identity 411 to retrieve the security credential 403, at 412. Importantly, the proxy identity 411 has an associated trust policy to allow the compute service manager 108 to retrieve the security credential 403 from the credential store 402.

At 413, the compute service manager 108 provides the retrieved security credential 403 to one or more execution nodes in the execution platform 110 for use in accessing the external resource 405. In some embodiments, the compute service manager 108 may pass the retrieved security credential in a data structure to the execution platform 110. For example, the credential object 400 may initially comprise non-sensitive information to identify the security credential 403 and the compute service manager 108 may populate the credential object 400 with the security credential 403 before passing the credential object 400 to the one or more execution nodes of the execution platform 110. The data structure is stored in local memory (e.g., volatile memory) and not persisted. In this manner, the compute service manager 108 avoids persisting sensitive information.

At 414, the execution platform 110 uses the security credential 403 to access the external resource 405. For example, an execution node of the execution platform 110 may use the security credential 403 to access the data resource 406 from the storage platform 104.

In another example, an execution node of the execution platform 110 may use the security credential 403 to cause the remote computing environment 408 to execute the remote software component 407 to perform functionality provided thereby. The remote computing environment 408 comprises one or more computing machines that execute the remote software component 407 to provide additional functionality to users of the network-based data warehouse system 102. In some embodiments, the remote computing environment 408 may be included in or provided by the storage platform 104.

The remote software component 407 comprises a set of machine-readable instructions (e.g., code) that, when executed by the remote computing environment 408, cause the remote software component 407 to provide certain functionality. The remote software component 407 may operate on input data and generate result data based on processing, analyzing, or otherwise transforming the input data. As an example, the remote software component 407 may comprise a scalar function, a table function, or a stored procedure.

Figure 5:
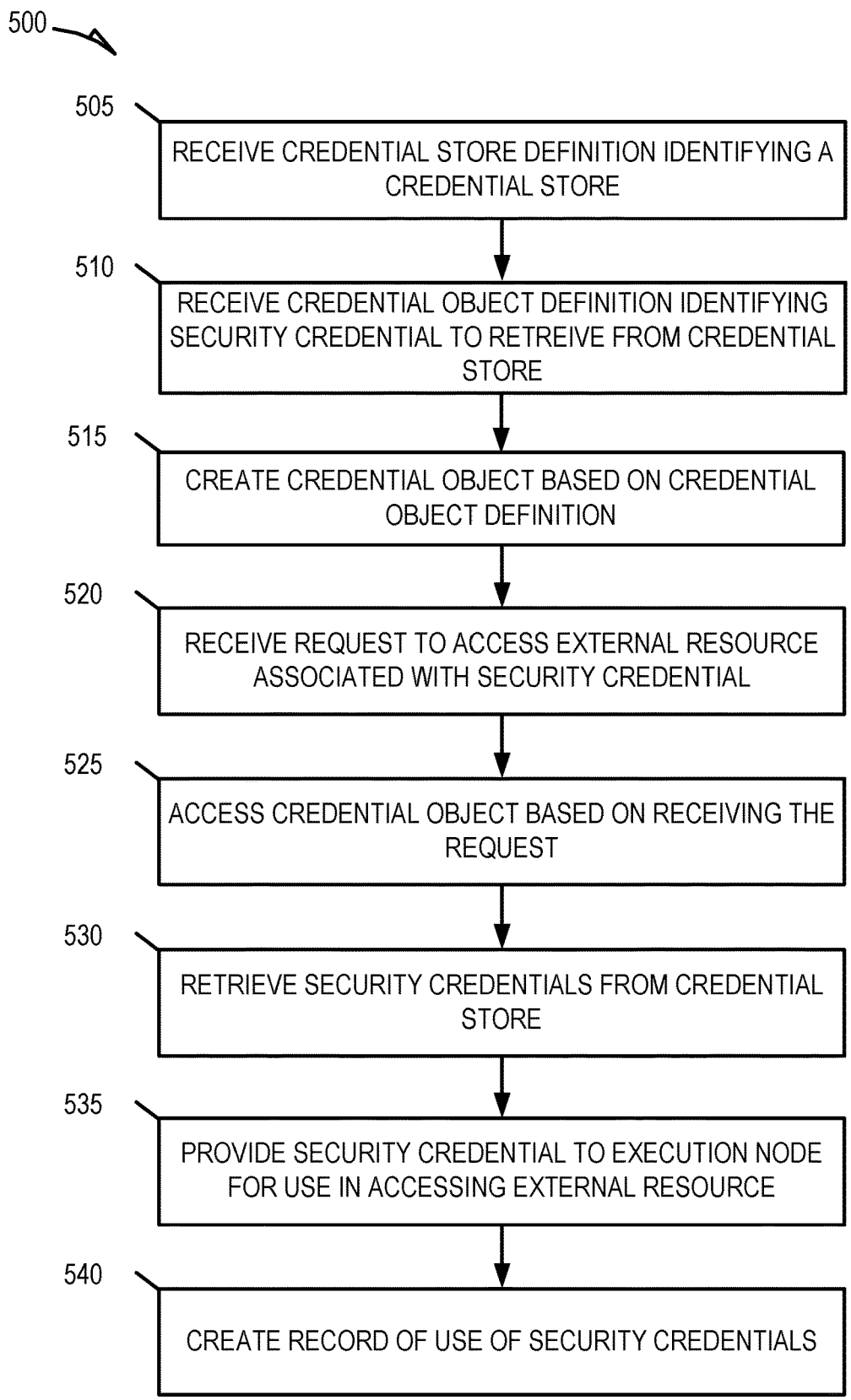
FIGS. 5 and 6 are flow diagrams illustrating operations of the network-based data warehouse system in performing a method for using a security credential stored at a remote credential store to access an external resource, in accordance with some embodiments of the present disclosure.

FIG. 5 is a flow diagram illustrating operations of the network-based data warehouse system 102 in performing a method 500 for using a security credential stored at a remote credential store to access an external resource, in accordance with some embodiments of the present disclosure. The method 500 may be embodied in computer-readable instructions for execution by one or more hardware components (e.g., one or more processors) such that the operations of the method 500 may be performed by components of network-based data warehouse system 102. Accordingly, the method 500 is described below, by way of example with reference thereto. However, it shall be appreciated that the method 500 may be deployed on various other hardware configurations and is not intended to be limited to deployment within the network-based data warehouse system 102.

At operation 505, the compute service manager 108 receives a credential store definition. The credential store definition is received from a computing device in communication with the data warehouse system 102 and is specified by a first entity via a command line or user interface provided to the computing device by the network-based data warehouse system 102. The first entity may be an administrative user belonging to a client account of the network-based data warehouse system 102. The credential store definition may be included as part of a credential store create command received from the computing device.

The credential store definition identifies a credential store provider and a remote credential store maintained by the credential store provider. The remote credential store stores security credentials used for accessed one or more network-based resources.

The credential store definition also includes access information to enable access by the compute service manager 108 to the remote credential store. For example, the access information may include a property or set of properties that are specific to the credential store provider that enable the compute service manager 108 to access the remote credential store. In some instances, the access information enables the compute service manager 108 to assume a proxy identity (e.g., an AWS role) that has associated permissions to retrieve security credentials stored by the credential store.

At operate 510, the compute service manager 108 receives a credential object definition identifying one or more security credentials to be retrieved from the remote credential store at runtime to facilitate access to an external resource. The one or more security credentials may, for example, include a username and a password to be used in accessing an external resource. The credential object may, accordingly, include an identifier or list of identifiers of one or more security credentials to be retrieved from the remote credential store. For example, the credential object definition may include one or more text strings to indicate which security credentials to retrieve. In some instances, the remote credential store may store a set of security credentials and the credential object definition may identify only a subset of the security credentials stored by the remote credential store.

At operation 515, the compute service manager 108 creates a credential object based on the credential object definition. The compute service manager 108 creates the credential object in an internal database of credential objects (e.g., database 112). Notably, the credential object does not include any sensitive information and no sensitive information is stored in the internal database. Instead, the credential object simply includes identifiers of the one or more credentials identified in the credential object definition (e.g., strings to indicate security credentials). In some instances, the credential object may further include an association with or identifier of the remote credential store.

At operation 520, the compute service manager 108 receives a request to access the external resource. The request may correspond to or be based on a data storage or data retrieval request received from a second computing device and associated with a second entity (e.g., a user, role, or function). Based on receiving the request to access the external resource, the compute service manager 108 accesses the credential object to identify one or more security credentials to retrieve from the remote credential store to be able to access the external resource, at operation 525.

At operation 530, the compute service manager 108 uses the access information specified in the credential store definition to retrieve the one or more security credentials identified by the credential object. To retrieve the one or more security credentials, the compute service manager 108 may transmit one or more requests to the remote credential store. For example, the compute service manager 108 may use the access information to assume a proxy identity at the credential store to retrieve the one or more security credentials. In some embodiments, the compute service manager 108 uses the access information to obtain temporary security credentials to assume the proxy identity.

At operation 535, the compute service manager 108 provides the one or more security credentials to one or more downstream processing components (e.g., an execution node of the execution platform 110) to access the external resource. The compute service manager 108 may provide the one or more security credentials within a data structure that is discarded after use. For example, the credential object may initially comprise non-sensitive information to identify the one or more security credentials and the compute service manager 108 can populate the credential object with the one or more security credentials before passing the credential object to the one or more execution nodes of the execution platform 110. The one or more retrieved security credentials are stored in local memory (e.g., volatile memory) and are not persisted to avoid persisting sensitive information. The one or more downstream components, in turn, access the external resource using the one or more security credentials in accordance with the request.

At operation 540, the compute service manager 108 creates a record in the metadata database 112 based on the use of the one or more security credentials to access the external resource. The record may comprise any one or more of: a timestamp, an indicator of the security credentials retrieved, an indicator of the remote credential store from which the one or more security credentials were retrieved, an indicator of the credential store provider that is responsible for maintaining the remote credential store, and an indicator of the entity (e.g., an account, user, role, or function) associated with the request.

In some instances, a retrieved security credential may change while the downstream components are still processing the request. For example, the security credential may expire before the downstream components are done accessing the external resource (e.g., short term authentication access tokens). In these instances, the compute service manager 108 may "refresh" the security credential by again retrieving new or updated security credential from the remote credential store and providing the new or updated security credential to the downstream components for continued processing.

Figure 6:
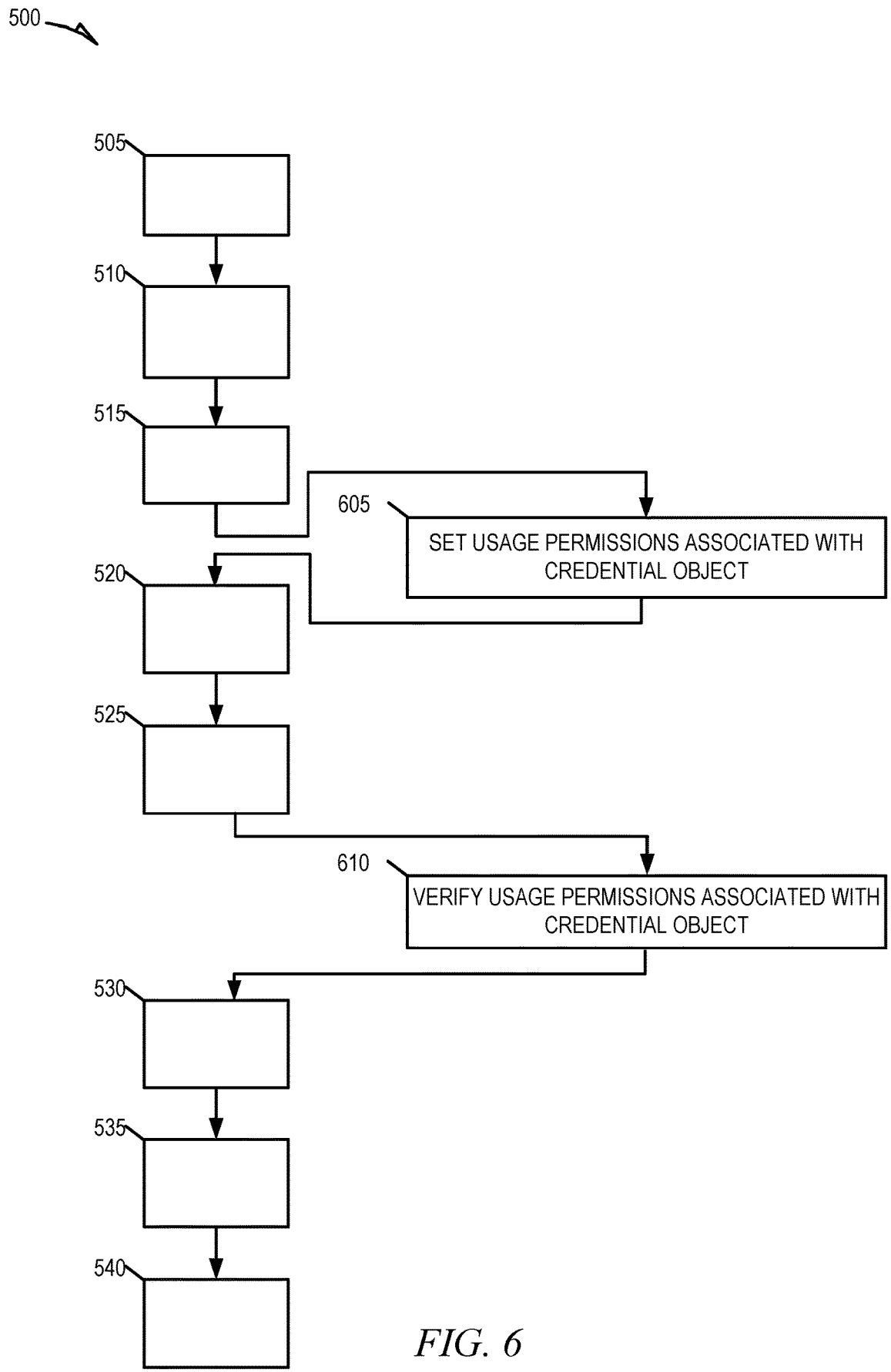

As shown in FIG. 6, the method 500 may, in some embodiments, include operations 605 and 610. In some embodiments, the operation 605 may be performed at any time subsequent to (e.g., as a sub-route or sub-task) operation 515 where the compute service manager 108 creates the credential object. In some embodiments, the operation 605 is performed as part of the operation 510 where the compute service manager 108 receives the credential object definition. At operation 605, the compute service manager 108 sets usage permissions for the credential object. The compute service manager 108 may set usage permissions based on input received from the first user. The setting of usage permissions for the credential object may comprise granting a second identity permission to use the one or more security credentials identified by the credential object to access the external resource. The second identity may correspond to user, role, or function within the context of the data warehouse system 102. An identity such as a role may correspond to multiple users, and thus in granting the second identity permission to use the one or more security credentials, the compute service manager 108 may provide permission to multiple users to use the credential object. The permission to use the one or more security credentials may be scoped based on one or more constraints. For example, the usage permissions granted to the second identity may place a temporal constraint on the use of the one or more security credentials (e.g., an expiration time or a valid time window). As another example, the usage permissions may limit the access of the second entity to certain data or services provided by the external resource.

As shown, operation 610 may be prior to retrieving the one or more security credentials from the remote credential store. At operation 610, the compute service manager 108 verifies usage permissions of the second entity associated with the request. In verifying the usage permissions associated with the second entity, the compute service manager 108 verifies the second entity has permission to use the credential object. In some instances, the compute service manager 108 may further verify that the second entity has associated permissions to use the one or more security credentials to access particular data or services in accordance with the request.

Figure 7:
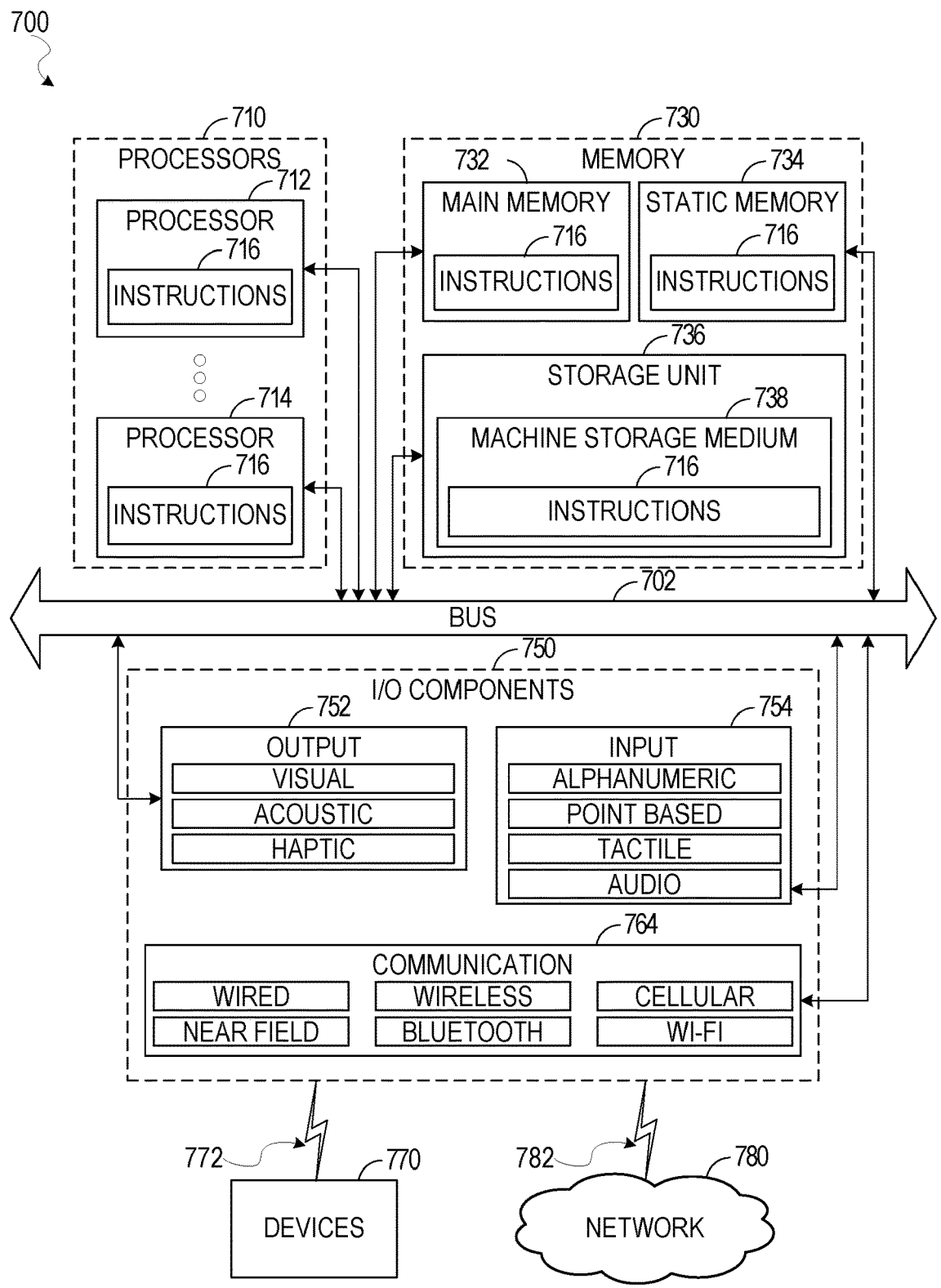
FIG. 7 illustrates a diagrammatic representation of a machine in the form of a computer system within which a set of instructions may be executed for causing the machine to perform any one or more of the methodologies discussed herein, in accordance with some embodiments of the present disclosure.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute any one or more operations of the method 500. As another example, the instructions 716 may cause the machine 700 to implement portions of the data flows illustrated in FIG. 4. In this way, the instructions 716 transform a general, non-programmed machine into a particular machine 700 (e.g., the compute service manager 108 or a node in the execution platform 110) that is specially configured to carry out any one of the described and illustrated functions in the manner described herein.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 includes processors 710, memory 730, and input/output (I/O) components 750 configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within machine storage medium 738 of the storage unit 736, within at least one of the processors 710 (e.g., within the processor's cache memory), or any suitable combination thereof, during execution thereof by the machine 700.

The I/O components 750 include components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components to provide communication via other modalities. The devices 770 may be another machine or any of a wide variety of peripheral devices (e.g., a peripheral device coupled via a universal serial bus (USB)). For example, as noted above, the machine 700 may correspond to any one of the compute service manager 108 or the execution platform 110, and the devices 770 may include the client device 114 or any other computing device described herein as being in communication with the network-based data warehouse system 102 or the cloud storage platform 104.

Executable Instructions and Machine Storage Medium

The various memories (e.g., 730, 732, 734, and/or memory of the processor(s) 710 and/or the storage unit 736) may store one or more sets of instructions 716 and data structures (e.g., software) embodying or utilized by any one or more of the methodologies or functions described herein. These instructions 716, when executed by the processor(s) 710, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

EXAMPLES

Example 1 is a system comprising: at least one hardware processor; and a memory storing instructions that cause the at least one hardware processor to perform operations comprising: receiving a credential store definition identifying a remote credential store and including access information to enable the system to access the remote credential store; receiving a credential object definition comprising an identifier of security credential to retrieve from the remote credential store, the security credential being associated with an external resource; creating, in a database, a credential object based on the credential object definition, the credential object identifying the security credential to retrieve from the remote credential store; receiving a request to access the external resource associated with the security credential; in response to receiving the request, retrieving, from the remote credential store, the security credential identified by the credential object using the access information; and providing the security credential retrieved from the remote credential store to a processing component for use in accessing the external resource.

Example 2 includes the system of Example 1, wherein the operations optionally comprise: generating a record, in the database, based on use of the security credential to access the external resource, the record including an identifier of an entity associated with the request.

Example 3 includes the system of any one or more of Examples 1 and 2, wherein the operations optionally comprise: setting one or more usage permissions associated with the credential object.

Example 4 includes the system of any one or more of Examples 1-3, wherein one or more usage permissions associated with the credential object include at least one constraint on the use of the security credential.

Example 5 includes the system of any one or more of Examples 1-4, wherein the operations optionally comprise: verifying one or more usage permissions of an entity associated with the request before retrieving the security credential.

Example 6 includes the system of any one or more of Examples 1-5, wherein the operations optionally comprise verifying that the entity has permission to use the credential object.

Example 7 includes the system of any one or more of Examples 1-6, wherein: the setting of the one or more usage permissions associated with the credential object comprises granting permission to a user, role, or function to use the security credential associated with the credential object.

Example 8 includes the system of any one or more of Examples 1-7, wherein the operations optionally comprise: accessing, in response to the request, the credential object to identify the security credential to retrieve to access the external resource.

Example 9 includes the system of any one or more of Examples 1-8, wherein the operations optionally comprise: using access information to assume a proxy identity at the remote credential store, the proxy identity having associated permissions to retrieve the security credential from the remote credential store.

Example 10 includes the system of any one or more of Examples 1-9, wherein the security credentials comprises at least one of: a username and password.

Example 11 is a method comprising: receiving a credential store definition identifying a remote credential store and including access information to enable access to the remote credential store; receiving a credential object definition comprising an identifier of security credential to retrieve from the remote credential store, the security credential being associated with an external resource; creating, in a database, by one or more processors, a credential object based on the credential object definition, the credential object identifying the security credential to retrieve from the remote credential store; receiving a request to access the external resource associated with the security credential; in response to receiving the request, retrieving, from the remote credential store, the security credential identified by the credential object using the access information; and providing the security credential retrieved from the remote credential store to a processing component for use in accessing the external resource.

Example 12 includes the method of Example 11, wherein the operations optionally comprise: generating a record, in the database, based on use of the security credential to access the external resource, the record including an identifier of an entity associated with the request.

Example 13 includes the method of any one or more of Examples 11 and 12, wherein the operations optionally comprise: setting one or more usage permissions associated with the credential object.

Example 14 includes the method of any one or more of Examples 11-13, wherein one or more usage permissions associated with the credential object include at least one constraint on the use of the security credential.

Example 15 includes the method of any one or more of Examples 11-14, wherein the operations optionally comprise: verifying one or more usage permissions of an entity associated with the request before retrieving the security credential.

Example 16 includes the method of any one or more of Examples 11-15, wherein the operations optionally comprise verifying that the entity has permission to use the credential object.

Example 17 includes the method of any one or more of Examples 11-16, wherein: the setting of the one or more usage permissions associated with the credential object comprises granting permission to a user, role, or function to use the security credential associated with the credential object.

Example 18 includes the method of any one or more of Examples 11-17, wherein the operations optionally comprise: accessing, in response to the request, the credential object to identify the security credential to retrieve to access the external resource.

Example 19 includes the method of any one or more of Examples 11-18, wherein the operations optionally comprise: using access information to assume a proxy identity at the remote credential store, the proxy identity having associated permissions to retrieve the security credential from the remote credential store.

Example 20 includes a computer-storage medium comprising instructions that, when executed by one or more processors of a machine, configure the machine to perform operations comprising: receiving a credential store definition identifying a remote credential store and including access information to enable access to the remote credential store; receiving a credential object definition comprising an identifier of security credential to retrieve from the remote credential store, the security credential being associated with an external resource; creating, in a database, a credential object based on the credential object definition, the credential object identifying the security credential to retrieve from the remote credential store; receiving a request to access the external resource associated with the security credential; in response to on receiving the request, retrieving, from the remote credential store, the security credential identified by the credential object using the access information; and providing the security credential retrieved from the remote credential store to a processing component for use in accessing the external resource.

Example 21 includes the method of Example 20, wherein the operations optionally comprise: generating a record, in the database, based on use of the security credential to access the external resource, the record including an identifier of an entity associated with the request.

Example 22 includes the computer-storage medium of any one or more of Examples 20 and 21, wherein the operations optionally comprise: setting one or more usage permissions associated with the credential object.

Example 23 includes the computer-storage medium of any one or more of Examples 20-22, wherein one or more usage permissions associated with the credential object include at least one constraint on the use of the security credential.

Example 24 includes the computer-storage medium of any one or more of Examples 20-23, wherein the operations optionally comprise: verifying one or more usage permissions of an entity associated with the request before retrieving the security credential.

Example 25 includes the computer-storage medium of any one or more of Examples 20-24, wherein the operations optionally comprise verifying that the entity has permission to use the credential object.

Example 26 includes the computer-storage medium of any one or more of Examples 20-25, wherein: the setting of the one or more usage permissions associated with the credential object comprises granting permission to a user, role, or function to use the security credential associated with the credential object.

Example 27 includes the computer-storage medium of any one or more of Examples 20-26, wherein the operations optionally comprise: accessing, in response to the request, the credential object to identify the security credential to retrieve to access the external resource.

Example 28 includes the computer-storage medium of any one or more of Examples 20-27, wherein the operations optionally comprise: using access information to assume a proxy identity at the remote credential store, the proxy identity having associated permissions to retrieve the security credential from the remote credential store.

What is claimed is:

1. A system comprising:
    at least one hardware processor; and
    at least one memory storing instructions that cause the at least one hardware processor to perform operations comprising:
    receiving a request to access an external resource;
    in response to receiving the request, identifying, based on a credential store definition, a remote credential store in a cloud credential store provider system that is external to the system, the credential store definition comprising access information associated with the cloud credential store provider system, the remote credential store storing a security credential associated with the external resource;
    retrieving, from the remote credential store in the cloud credential store provider system that is external to the system, the security credential using the access information in the credential store definition;
    providing the security credential to a processing component for use in accessing the external resource; and
    generating a record, in an internal database of the system that is external to the remote credential store, based on use of the security credential by the processing component to access the external resource, the record including a first identifier corresponding to a cloud credential store provider that maintains the remote credential store, and a second identifier corresponding to an entity associated with the request.

2. The system of claim 1, wherein retrieving the security credential further comprises:
    using the access information to assume a proxy identity within the external system that has associated permissions to retrieve the security credential from the remote credential store.

3. The system of claim 1, wherein the operations further comprise:
    accessing a credential object associated with the external resource to identify the security credential to retrieve to access the external resource.

4. The system of claim 3, wherein the operations further comprise:
    creating, in the internal database, the credential object based on a credential object definition, the credential object including an identifier of the security credential.

5. The system of claim 4, wherein the operations further comprise receiving the credential object definition comprising the identifier of the security credential to retrieve from the remote credential store.

6. The system of claim 3, wherein the operations further comprise:
    setting one or more usage permissions associated with the credential object.

7. The system of claim 6, wherein the one or more usage permissions associated with the credential object include at least one constraint on the use of the security credential.

8. The system of claim 6, wherein the operations further comprise:
    verifying the one or more usage permissions of an entity associated with the request before retrieving the security credential.

9. The system of claim 8, wherein the verifying of the one or more usage permissions includes:
    verifying that the entity has permission to use the credential object.

10. The system of claim 6, wherein:
    the setting of the one or more usage permissions associated with the credential object comprises granting permission to a user, role, or function to use the security credential associated with the credential object.

11. The system of claim 1, further comprising: one or more execution nodes, wherein providing the security credential to the processing component comprises providing the security credential to the one or more execution nodes, wherein the one or more execution nodes store the security credential in volatile memory.

12. The system of claim 1, wherein the security credential comprises at least one of: a username and password.

13. A method comprising:
    receiving a request to access an external resource;
    in response to receiving the request, identifying, based on a credential store definition stored in a metadata database, a remote credential store in a cloud credential store provider system that is external to the metadata database, the credential store definition comprising access information associated with the cloud credential store provider system, the remote credential store storing a security credential associated with the external resource;
    retrieving, from the remote credential store in the cloud credential store provider system that is external to the metadata database, the security credential using the access information in the credential store definition;
    providing the security credential to a processing component for use in accessing the external resource; and
    generating, by one or more hardware processors, a record, in an internal database of the system that is external to the remote credential store, based on use of the security credential by the processing component to access the external resource, the record including a first identifier corresponding to a cloud credential store provider that maintains the remote credential store, and a second identifier corresponding to an entity associated with the request.

14. The method of claim 13, wherein retrieving the security credential further comprises:
    using the access information to assume a proxy identity within the external system that has associated permissions to retrieve the security credential from the remote credential store.

15. The method of claim 13, further comprising:
    accessing a credential object associated with the external resource to identify the security credential to retrieve to access the external resource.

16. The method of claim 15, further comprising:
    creating, in the internal database, the credential object based on a credential object definition, the credential object including an identifier of the security credential.

17. The method of claim 15, further comprising:

setting one or more usage permissions associated with the credential object, the one or more usage permissions including at least one constraint on the use of the security credential, wherein the setting of the one or more usage permissions associated with the credential object comprises granting permission to a user, role, or function to use the security credential associated with the credential object.

18. The method of claim 17, further comprising:

verifying the one or more usage permissions of an entity associated with the request before retrieving the security credential.

19. The method of claim 13, wherein providing the security credential to the processing component comprises providing the security credential to one or more execution nodes, wherein the one or more execution nodes store the security credential in volatile memory.

20. A computer-storage medium comprising instructions that, when executed by one or more processors of a machine, configure the machine to perform operations comprising:

receiving a request to access an external resource;

in response to receiving the request, identifying, based on a credential store definition stored in a metadata database, a remote credential store in a cloud credential store provider system that is external to the metadata database, the credential store definition comprising access information associated with the cloud credential store provider system, the remote credential store storing a security credential associated with the external resource;

retrieving, from the remote credential store in the cloud credential store provider system that is external to the metadata database, a security credential associated with the external resource using the access information in the credential store definition;

providing the security credential to a processing component for use in accessing the external resource; and generating a record, in an internal database of the system that is external to the remote credential store, based on use of the security credential by the processing component to access the external resource, the record including a first identifier corresponding to a cloud credential store provider that maintains the remote credential store, and a second identifier corresponding to an entity associated with the request.

21. The computer-storage medium of claim 20, wherein retrieving the security credential further comprises:

using the access information to assume a proxy identity within the external system that has associated permissions to retrieve the security credential from the remote credential store.

22. The computer-storage medium of claim 20, wherein the operations further comprise:

accessing a credential object associated with the external resource to identify the security credential to retrieve to access the external resource.

23. The computer-storage medium of claim 22, wherein the operations further comprise:

creating, in the internal database, the credential object based on a credential object definition, the credential object including an identifier of the security credential; and setting one or more usage permissions associated with the credential object, the one or more usage permissions including at least one constraint on the use of the security credential, wherein the setting of the one or more usage permissions associated with the credential object comprises granting permission to a user, role, or function to use the security credential associated with the credential object.

24. The computer-storage medium of claim 23, wherein the operations further comprise:

verifying the one or more usage permissions of an entity associated with the request before retrieving the security credential.

* * * * *